(12) United States Patent
Warkentin et al.

(10) Patent No.: US 9,566,587 B2
(45) Date of Patent: Feb. 14, 2017

(54) METHODS OF AND SYSTEMS FOR TREATING INCINERATED WASTE

(71) Applicant: BLUE SKY MINES LTD., Vancouver, British Columbia (CA)

(72) Inventors: Douglas Dale Warkentin, Vancouver (CA); Michael Victor Rowley, Vancouver (CA)

(73) Assignee: BLUE SKY MINES LTD., Vancouver (CA)

( * ) Notice: Subject to any disclaimer, the term of this patent is extended or adjusted under 35 U.S.C. 154(b) by 0 days.

(21) Appl. No.: 14/435,122

(22) PCT Filed: Oct. 12, 2012

(86) PCT No.: PCT/CA2012/000945
§ 371 (c)(1),
(2) Date: Apr. 10, 2015

(87) PCT Pub. No.: WO2014/056065
PCT Pub. Date: Apr. 17, 2014

(65) Prior Publication Data
US 2015/0258552 A1    Sep. 17, 2015

(51) Int. Cl.
*B03B 7/00* (2006.01)
*B03B 9/04* (2006.01)
(Continued)

(52) U.S. Cl.
CPC . *B03B 9/04* (2013.01); *A62D 3/33* (2013.01); *B02C 23/08* (2013.01); *B03B 1/04* (2013.01);
(Continued)

(58) Field of Classification Search
CPC .............. B03C 1/16; B03C 1/30; B03C 1/247; B03B 1/04; B03B 9/04
(Continued)

(56) References Cited

U.S. PATENT DOCUMENTS 2,428,228 A * 9/1947 Keck ................. B03B 9/061
                                                    209/11
2,806,598 A * 9/1957 Brown ................. B03B 9/00
                                                    209/166
(Continued)

FOREIGN PATENT DOCUMENTS

CA    2085769 A1    6/1993
CA    2152644 A1    1/1996
(Continued)

OTHER PUBLICATIONS

Bioteq Environmental Technologies, Water Problems Solved, downloaded from http://bioteq.ca on Aug. 17, 2015, 6 pages.
(Continued)

*Primary Examiner* — Terrell Matthews
(74) *Attorney, Agent, or Firm* — Lewis Roca Rothgerber Christie LLP

(57) ABSTRACT

One method of treating incinerated waste comprises: size separating at least some of the incinerated waste into a first undersize fraction comprising particles smaller than the first separation size and into a first oversize fraction comprising particles larger than the first separation size; size reducing at least some of the first oversize fraction; size separating at least some of the size-reduced first oversize fraction into a second undersize fraction comprising particles smaller than the second separation size and into a second oversize fraction comprising particles larger than the second separation size; combining at least some of the first undersize fraction and at least some of the second undersize fraction into a fine fraction; and extracting metal from at least some of the fine fraction. Another method of treating incinerated waste comprises extracting metal by froth flotation from at least some of the incinerated waste. Systems are also disclosed.

20 Claims, 4 Drawing Sheets

(51) Int. Cl.

| | | |
|---|---|---|
| A62D 3/33 | (2007.01) | |
| B03C 1/16 | (2006.01) | |
| B03C 1/247 | (2006.01) | |
| B03C 1/30 | (2006.01) | |
| C04B 28/00 | (2006.01) | |
| C04B 28/04 | (2006.01) | |
| C04B 18/10 | (2006.01) | |
| B02C 23/08 | (2006.01) | |
| B03B 1/04 | (2006.01) | |
| B03D 1/00 | (2006.01) | |
| C04B 18/14 | (2006.01) | |
| A62D 101/08 | (2007.01) | |
| A62D 101/24 | (2007.01) | |
| A62D 101/43 | (2007.01) | |
| B01D 21/02 | (2006.01) | |

(52) U.S. Cl.
CPC .............. *B03C 1/16* (2013.01); *B03C 1/247* (2013.01); *B03C 1/30* (2013.01); *B03D 1/00* (2013.01); *C04B 18/10* (2013.01); *C04B 18/149* (2013.01); *C04B 28/006* (2013.01); *C04B 28/04* (2013.01); *A62D 2101/08* (2013.01); *A62D 2101/24* (2013.01); *A62D 2101/43* (2013.01); *B01D 21/02* (2013.01); *B03C 2201/18* (2013.01); *B03C 2201/20* (2013.01); *F23J 2700/001* (2013.01); *F23J 2900/01001* (2013.01); *Y02P 40/165* (2015.11); *Y02W 30/92* (2015.05)

(58) Field of Classification Search
USPC ........................................................ 209/12.1
See application file for complete search history.

(56) References Cited

U.S. PATENT DOCUMENTS

| | | | | |
|---|---|---|---|---|
| 2,971,703 | A | * | 2/1961 | Rath ................ B03B 9/04 209/214 |
| 3,926,896 | A | | 12/1975 | Dumoulin |
| 4,044,956 | A | * | 8/1977 | Benedetto .......... B03B 9/04 241/20 |
| 4,077,847 | A | | 3/1978 | Choi et al. |
| 4,121,945 | A | | 10/1978 | Hurst et al. |
| 4,376,043 | A | * | 3/1983 | Heijwegen .......... B03B 9/04 209/164 |
| 4,404,022 | A | * | 9/1983 | Godbehere ........ B03B 9/04 209/164 |
| 4,737,273 | A | * | 4/1988 | Snow ................ B03D 1/021 209/166 |
| 4,804,147 | A | | 2/1989 | Hooper |
| 4,815,667 | A | | 3/1989 | Keller |
| 4,859,318 | A | * | 8/1989 | Brookes ............ B03B 9/005 209/166 |
| 5,024,226 | A | | 6/1991 | Tan |
| 5,051,190 | A | | 9/1991 | Schwyter |
| 5,126,738 | A | | 6/1992 | Sasaki |
| 5,174,509 | A | | 12/1992 | Starke et al. |
| 5,276,312 | A | | 1/1994 | McCarthy |
| 5,308,435 | A | | 5/1994 | Ruggles et al. |
| 5,309,338 | A | | 5/1994 | Liu |
| 5,443,157 | A | | 8/1995 | Baker et al. |
| 5,587,079 | A | | 12/1996 | Rowley et al. |
| 5,649,895 | A | | 7/1997 | Fix et al. |
| 5,669,969 | A | | 9/1997 | Meade et al. |
| 5,671,688 | A | | 9/1997 | Burgin et al. |
| 5,796,251 | A | | 8/1998 | Le Febre et al. |
| 5,906,321 | A | | 5/1999 | Martin |
| 5,938,776 | A | | 8/1999 | Sicola et al. |
| 5,992,776 | A | | 11/1999 | Arcaini et al. |
| 7,655,088 | B2 | | 2/2010 | Bethani |
| 7,704,907 | B2 | | 4/2010 | Guenther et al. |
| 2003/0079656 | A1 | | 5/2003 | Lakshmanan et al. |
| 2003/0183139 | A1 | | 10/2003 | Martin et al. |
| 2004/0099576 | A1 | | 5/2004 | Rem et al. |
| 2004/0217505 | A1 | | 11/2004 | Singh |
| 2006/0162618 | A1 | | 7/2006 | Bethani |
| 2006/0162619 | A1 | | 7/2006 | Bethani |
| 2006/0213397 | A1 | | 9/2006 | Bethani |
| 2007/0049487 | A1 | | 3/2007 | Guenther et al. |
| 2007/0158243 | A1 | | 7/2007 | Rem et al. |
| 2007/0163926 | A1 | | 7/2007 | Rem et al. |
| 2008/0093271 | A1 | | 4/2008 | Rem et al. |
| 2008/0236457 | A1 | | 10/2008 | Rem et al. |
| 2008/0250723 | A1 | | 10/2008 | Fragiacomo |
| 2010/0144949 | A1 | | 6/2010 | Bethani |
| 2010/0151157 | A1 | | 6/2010 | Quadrio Curzio |
| 2010/0273630 | A1 | | 10/2010 | Guenther et al. |
| 2010/0314298 | A1 | | 12/2010 | Rem et al. |
| 2010/0319581 | A1 | | 12/2010 | Bethani |
| 2011/0100260 | A1 | | 5/2011 | Quadrio Curzio |
| 2011/0120348 | A1 | | 5/2011 | Oehr et al. |
| 2012/0235320 | A1 | | 9/2012 | Guenther et al. |
| 2013/0000521 | A1 | | 1/2013 | Quadrio Curzio |

FOREIGN PATENT DOCUMENTS

| | | |
|---|---|---|
| CA | 1340476 E | 3/1999 |
| CA | 2288582 A1 | 5/2000 |
| CA | 2390906 A1 | 12/2002 |
| CA | 2418020 A1 | 8/2004 |
| CA | 2615505 A1 | 2/2007 |
| CN | 101509078 A | 8/2009 |
| EP | 3549932 B1 | 4/1997 |
| EP | 1382584 A1 | 1/2004 |
| EP | 1749804 A2 | 2/2007 |
| EP | 1800753 A1 | 6/2007 |
| EP | 1893385 B1 | 8/2012 |
| GB | 516603 A | 1/1940 |
| GB | 660149 A | 10/1951 |
| GB | 1466185 A | 3/1977 |
| JP | 8-24831 A | 1/1996 |
| JP | 3911538 B2 | 12/2001 |
| JP | 2001348627 A | 12/2001 |
| JP | 2003073153 A | 3/2003 |
| JP | 2005272955 A | 10/2005 |
| JP | 2006015190 A | 1/2006 |
| WO | 9729804 A1 | 8/1997 |
| WO | 0003807 A1 | 1/2000 |
| WO | 0040336 A1 | 7/2000 |
| WO | 0121317 A1 | 3/2001 |
| WO | 2004082838 A1 | 9/2004 |
| WO | 2006074946 A2 | 7/2006 |
| WO | 2006126872 A1 | 11/2006 |
| WO | 2007013810 A2 | 2/2007 |
| WO | 2007024505 A2 | 3/2007 |
| WO | 2007027090 A2 | 3/2007 |
| WO | 2008142607 A2 | 11/2008 |
| WO | 2009138823 A1 | 11/2009 |

OTHER PUBLICATIONS

Energy Research Centre of the Netherlands, The ECN/HVC project for BioSNG, retrieved from http://www.biofuelstp.eu/spm2/pdfs/Poster_ECN.pdf on Feb. 5, 2016, 1 sheet.

Hu, Y., HHW composition and bottom ash quality, retrieved by accessing http://www.citg.tudelft.nl/live/pagina.jsp?id=a7a1267b-e0dc-4901-bb6c-b752d3221aa0&lang=en on Feb. 5, 2016, 1 sheet.

International Search Report of PCT/CA2012/000945, dated Jul. 9, 2013, 7 pages.

Written Opinion of the International Searching Authority of PCT/CA2012/000945, dated Jul. 9, 2013, 6 pages.

Lam, C.H.K. et al., Use of Incineration MSW Ash: A Review, Sustainability, 2010, vol. 2, pp. 1943-1968.

Millrath, K. et. al., Waste-to-Energy Residues —The Search for Beneficial Uses, 12th Annual North American Waste-to-Energy Conference, May 17-19, 2004, pp. 75-82.

Muchova, L., Innovative Technology for the Treatment of Bottom Ash, Nov. 12, 2007, 24 pages.

(56) References Cited

OTHER PUBLICATIONS

Muchova, L, Wet bottom ash separation, retrieved by accessing http://www.tudelft.nl/live/pagina.jsp?id=224fc32eae4b-4101-b6c7-22a40401b44f&lang=en on Feb. 5, 2016, 2 pages.
Rowley, M., Background research on Dutch bottom ash patent application, May 1, 2009, 15 pages.
Extended European Search Report dated Jun. 3, 2016, issued in corresponding EP Application No. 12886210.9, 8 pages.
Parekh, B.K. et al., Excerpt taken from "Advances in Flotation Technology" SME, 1999; 1 sheet.
Fuerstenau, M. C. et al., Excerpts taken from pp. 339-340 of "Froth Flotation: A Century of Innovation", SME, 2007.

* cited by examiner

METHODS OF AND SYSTEMS FOR TREATING INCINERATED WASTE

CROSS-REFERENCE TO RELATED APPLICATIONS

This application is a National Phase Patent Application and claims priority to and the benefit of International Application Number PCT/CA 2012/000945, filed on Oct. 12, 2012, the entire disclosure of which is incorporated herein by reference.

BACKGROUND

1, Field

The invention relates generally to waste treatment, and more particularly to methods of and systems for treating incinerated waste.

2, Related Art

Incineration of waste, such as municipal solid waste for example, may alleviate demands for landfills and for other ways of disposing of such waste. Incineration of waste in an incinerator generally produces: (1) flue gases such as carbon dioxide and water vapor for example; (2) fly ash, which escapes up a chimney of the incinerator; and (3) bottom ash, which collects on an incineration grate of the incinerator. Some or all of the bottom ash may be disposed of in a landfill, but doing so increases demands for landfills, which may be restricted in some areas, and metal from bottom ash disposed of in a landfill may pollute nearby water sources for example. Also, some or all of the bottom ash may be treated for use in various applications such as manufacture of concrete products for example. However, metal from bottom ash in concrete products may oxidize over time, causing gaseous hydrogen to be produced in the concrete products and potentially damaging the concrete products.

SUMMARY

According to one illustrative embodiment, there is provided a method of treating incinerated waste, the method comprising: size separating at least some of the incinerated waste, according to a first separation size, into a first undersize fraction comprising particles smaller than the first separation size and into a first oversize fraction comprising particles larger than the first separation size; size reducing at least some of the first oversize fraction into a size-reduced first oversize fraction; size separating at least some of the size-reduced first oversize fraction, according to a second separation size, into a second undersize fraction comprising particles smaller than the second separation size and into a second oversize fraction comprising particles larger than the second separation size; combining at least some of the first undersize fraction and at least some of the second undersize fraction into a fine fraction; and extracting metal from at least some of the fine fraction.

According to another illustrative embodiment, there is provided a method of treating incinerated waste, the method comprising extracting metal by froth flotation from at least some of the incinerated waste.

According to another illustrative embodiment, there is provided a system for treating incinerated waste, the system comprising: a means for size separating at least some of the incinerated waste, according to a first separation size, into a first undersize fraction comprising particles smaller than the first separation size and into a first oversize fraction comprising particles larger than the first separation size; a means for size reducing at least some of the first oversize fraction into a size-reduced first oversize fraction; a means for size separating at least some of the size-reduced first oversize fraction, according to a second separation size, into a second undersize fraction comprising particles smaller than the second separation size and into a second oversize fraction comprising particles larger than the second separation size; and a means for extracting metal from at least some of a fine fraction comprising at least some of the first undersize fraction and at least some of the second undersize fraction.

According to another illustrative embodiment, there is provided a system for treating incinerated waste, the system comprising a means for extracting metal by froth flotation from at least some of the incinerated waste.

According to another illustrative embodiment, there is provided a system for treating incinerated waste, the system comprising: a first size separator configured for size separating at least some of the incinerated waste, according to a first separation size, into a first undersize fraction comprising particles smaller than the first separation size and into a first oversize fraction comprising particles larger than the first separation size; at least one size reduction apparatus configured for size reducing at least some of the first oversize fraction into a size-reduced first oversize fraction; a second size separator configured for size separating at least some of the size-reduced first oversize fraction, according to a second separation size, into a second undersize fraction comprising particles smaller than the second separation size and into a second oversize fraction comprising particles larger than the second separation size; and a first at least one metal extraction apparatus configured to extract metal from at least some of a fine fraction comprising at least some of the first undersize fraction and at least some of the second undersize fraction.

According to another illustrative embodiment, there is provided a system for treating incinerated waste, the system comprising a first at least one metal extraction apparatus configured for extracting metal by froth flotation from at least some of the incinerated waste.

Other aspects and features of the present invention will become apparent to those ordinarily skilled in the art upon review of the following description of illustrative embodiments in conjunction with the accompanying figures.

DETAILED DESCRIPTION

Figure 1:
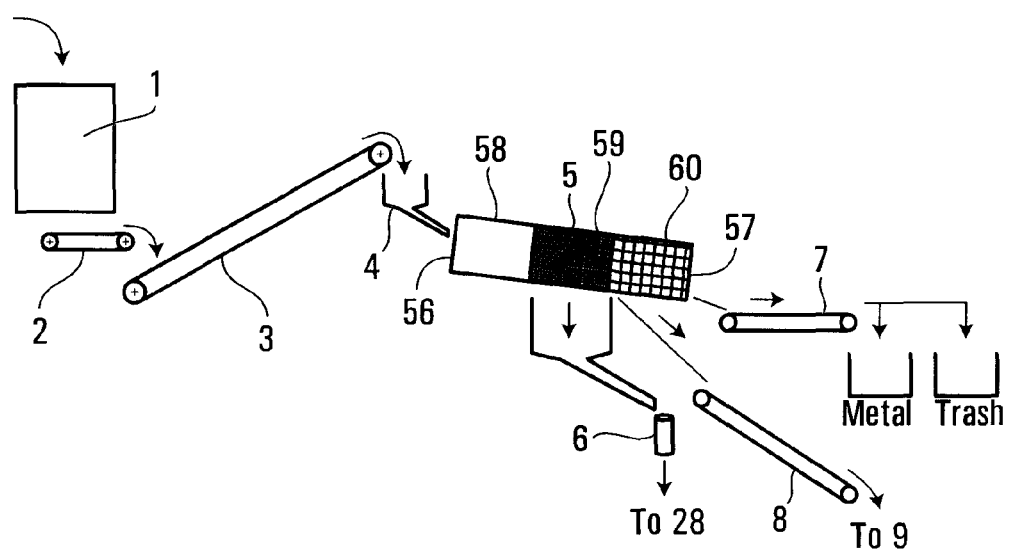
FIG. 1 is a schematic illustration of an initial washing and size separation portion of a system for treating incinerated waste according to one illustrative embodiment.

Referring to FIG. 1, a system for treating incinerated waste according to one illustrative embodiment includes a feed bin 1 for receiving the incinerated waste. In the embodiment shown, the incinerated waste includes raw bottom ash (which may also be referred to as grate ash, clinker, or slag) from municipal solid waste that was incinerated in a waste-to-energy facility (not shown). However, in alternative embodiments, the incinerated waste may include other incinerated waste, which may be from other mixed-waste incinerators or waste-to-energy facilities. In various embodiments, the incinerated waste may include segregated ash such as bottom ash where the combustion products are segregated, or a mixed ash product that may include one or more of fly ash, flue dust, grate siftings, bag house solids, and pozzolanic ash solids in combination with the bottom ash.

From the feed bin 1, a mechanical feeder 2 (such as a pan or belt feeder for example) in the embodiment shown feeds the incinerated waste onto a conveyor 3, and in some embodiments the mechanical feeder 2 may feed the incinerated waste onto the conveyor 3 at a generally constant rate. In the embodiment shown, the conveyor 3 transports the incinerated waste to a feed chute 4, through which the incinerated waste enters a washing and size separation device 5, which includes a cylindrical trommel screen that may cause minor attrition of the incinerated waste received at the feed chute 4.

In various embodiments, the feed bin 1 may be configured to receive incinerated waste, such as raw ash that may include bottom ash or more particularly bottom ash from incinerated municipal solid waste for example, by positioning the feed bin 1 to receive the incinerated waste from a stockpile, directly from an operating waste-to-energy facility, or from a combination of both. For example, the feed bin 1 may receive the incinerated waste from mobile equipment such as a front-end loader or dump truck, or from a conveyor directly from an incinerator (not shown). Also, in various embodiments, the system may be in a stand-alone facility in which the feed bin 1 receives the incinerated waste from one or more remote waste-to-energy facilities, or the system may be integrated directly into the operation of a single facility whereby the feed bin 1 receives the incinerated waste from one or more incinerators in the single facility. In such embodiments, the size separation device 5 may be configured to receive incinerated waste through the feed bin 1, the mechanical feeder 2, the conveyor 3, and the feed chute 4, and the size separation device 5 may be configured to size separate such incinerated waste as described below.

The cylindrical trommel screen of the embodiment shown has an inlet on a first end 56 of the cylindrical trommel screen to receive the incinerated waste from the feed chute 4, an outlet on a second end 57 of the cylindrical trommel screen opposite and downstream from the first end 56, a blind section 58 near the first end 56, a first screening section 59 including a cylindrical screen downstream from the blind section 58, and a second screening section 60 including a cylindrical screen downstream from the first screening section 59 and near the second end 57. In the embodiment shown, the first end 56 is higher than the second end 57 so that gravity facilitates movement of material downstream in the cylindrical trommel screen from the first end 56 through the blind section 58, through the first screening section 59, through the second screening section 60, and out the outlet at the second end 57.

In various embodiments, one or both of the feed chute 4 and the blind section 58 may include wash water sprayers (not shown) to wash the incinerated waste entering the inlet on the first end 56 of the cylindrical trommel screen with water. Also, in some embodiments, one or both of the first screening section 59 and the second screening section 60 may include cleaning sprayers (not shown) to clean one or both of the respective cylindrical screens of the first screening section 59 and of the second screening section 60 with water.

The blind section 58 may, in some embodiments, include water sprayers (not shown) for spraying a constant spray of water on the incinerated waste received from the feed chute 4 to urge the incinerated waste downstream in the cylindrical trommel screen towards the second end 57. Also, in some embodiments, the blind section 58 may include a delumper or a similar attritioning device (such as lifters to raise the incinerated waste and drop it from a height, for example) to break up loose lumps and aggregates in the incinerated waste before the incinerated waste reaches one or both of the first screening section 59 and the second screening section 60 downstream from the blind section 58.

The cylindrical screen of the first screening section 59 has openings of a first separation size, which in some embodiments may be between about 1.4 millimeters and about 6.5 millimeters, and which in some embodiments may be about 3 millimeters. A slurry including particles smaller than the first separation size passes through the openings of the cylindrical screen of the first screening section 59, and particles larger than the first separation size move downstream in the cylindrical trommel screen to the second screening section 60. Therefore, in the embodiment shown, the first screening section 59 functions generally as a first size separator for size separating at least some of the incinerated waste received from the feed chute 4, according to the first separation size, into a first undersize fraction including particles smaller than the first separation size and into a first oversize fraction including particles larger than the first separation size. The first undersize fraction may more generally be referred to as a fine fraction, and the first separation size may also be referred to as a fine separation size. In the embodiment shown, a slurry pump 6 receives the first undersize fraction and pumps the first undersize fraction to a slurry pump 28 that carries the first undersize fraction to a first at least one metal extraction apparatus shown in FIGS. 3 and 4 and described further below.

In the embodiment shown, the first oversize fraction from the first screening section 59 moves downstream in the cylindrical trommel screen to the second screening section 60. Also, in some embodiments, the particles in the first oversize fraction may be dewatered in the first screening section 59 sufficiently to allow conveyor transport. The cylindrical screen of the second screening section 60 has openings of a separation size (which may also be referred to as a maximum separation size) larger than the first separation size, and the second screening section 60 may thus be referred to as a maximum size separator. In some embodiments, the maximum separation size may be between about 7.5 centimeters and about 50 centimeters, and may be about 30 centimeters in some embodiments.

Therefore, in the embodiment shown, a main coarse fraction including particles of the incinerated waste larger than the first separation size and smaller than the maximum separation size (and thus including at least some of the first oversize fraction from the first screening section 59) passes through the openings of the cylindrical screen of the second screening section 60 to a conveyor 8, and an oversize reject fraction, which includes particles of the incinerated waste received from the feed chute 4 that are larger than the maximum separation size, passes through the second screening section 60, out the outlet at the second end 57, and onto a conveyor 7. The second screening section 60 thus removes, from the main coarse fraction, at least some particles larger than the maximum separation size before size reducing of the main coarse fraction as described below. On or after the conveyor 7, the oversize reject fraction in some embodiments may be sorted manually to remove coarse metals for recovery and to remove unburned combustible material that may be returned to an incinerator for further incineration, leaving crushable rock and slag that may be recombined with the main coarse fraction (on the conveyor 8, for example) for further processing as described below.

Although the size separation device 5 in the embodiment shown includes a cylindrical trommel screen, alternative embodiments may include one or more other size separators such as vibrating deck screens for example.

Figure 2:
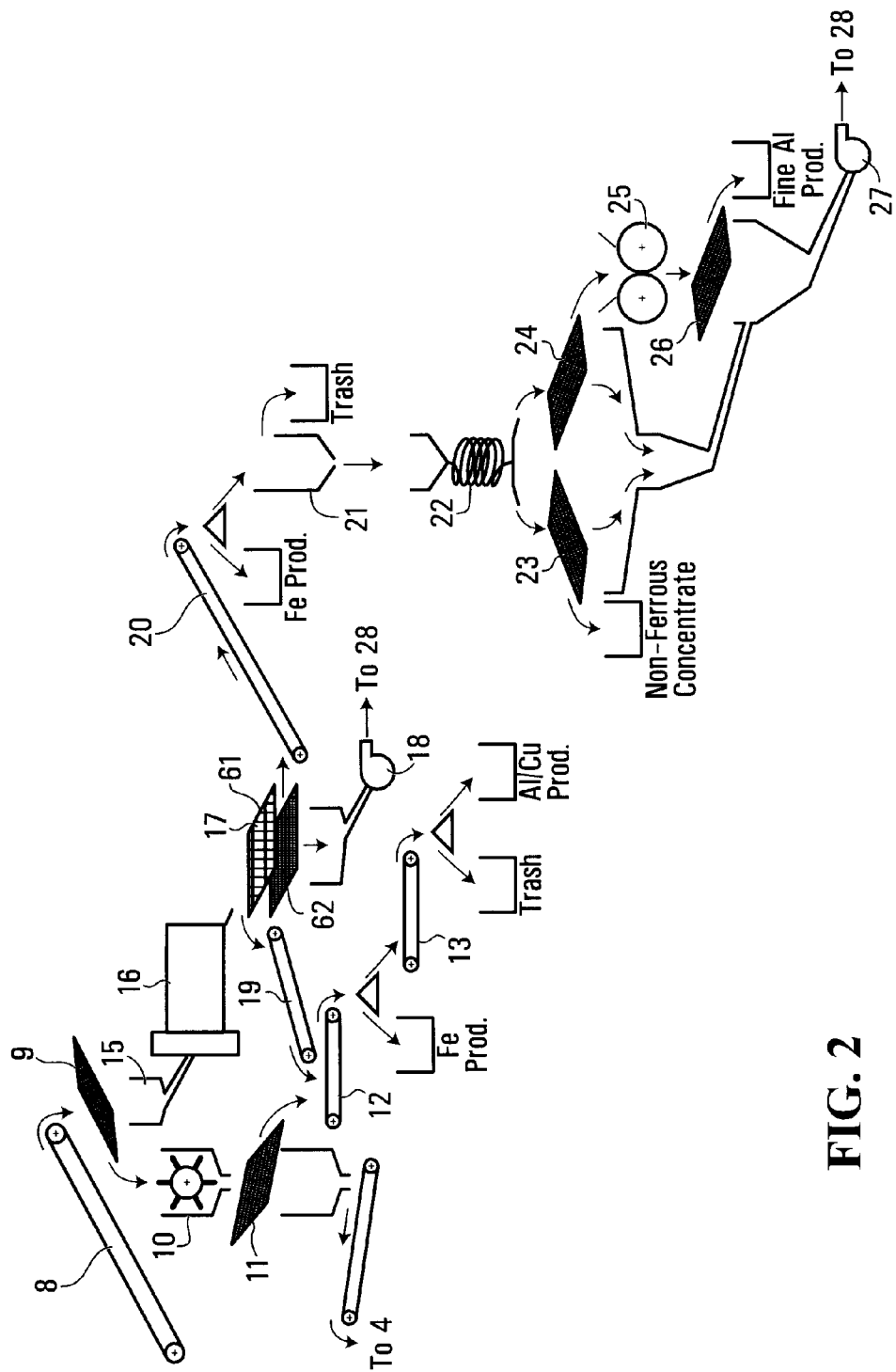
FIG. 2 is a schematic illustration of a size reduction portion of the system of FIG. 1.

Referring to FIG. 2, the main coarse fraction is conveyed to one or more comminution devices selected to fragment coarse material while generating a minimum of very fine material. For example, in some embodiments, the target size of particles produced by the one or more comminution devices may be between about 0.2 millimeters and about 6.5 millimeters. Metal extraction from finer material may be more difficult than metal extraction from coarser material, and therefore reducing production of very fine material in comminution devices may facilitate extraction of metal from the incinerated waste subjected to such comminution devices.

In the embodiment shown, the conveyor 8 conveys the main coarse fraction to a size separator 9, which in the embodiment shown includes a screen deck with openings having a separation size of 25 millimeters. In other embodiments, the separation size of the size separator 9 may range from about 1 centimeter to about 10 centimeters. The size separator 9 separates the main coarse fraction (which, as indicated above, includes at least some of the first oversize fraction from the first screening section 59), according to the separation size of the size separator 9, into an undersize fraction including particles smaller than the separation size of the size separator 9 and into an oversize fraction including particles larger than the separation size of the size separator 9.

The oversize fraction from the size separator 9 enters a feed chute for a kinetic impact device 10, which in the embodiment shown is a hammer mill but could in alternative embodiments be another crusher such as an impact crusher or a compression device such as a roll crusher for example, and which may more generally be referred to as a size reduction apparatus. In the embodiment shown, the kinetic impact device 10 reduces sizes of particles of the oversize fraction from the size separator 9 in a single pass into a size-reduced oversize fraction from the size separator 9. The system further includes a size separator 11 for receiving and size separating the size-reduced oversize fraction from the kinetic impact device 10. In the embodiment shown, the size separator 11 includes a screen having openings of a separation size of about 25 millimeters to separate the size-reduced oversize fraction from the kinetic impact device 10 into an undersize fraction including particles smaller than the separation size of the size separator 11 and into an oversize fraction including particles larger than the separation size of the size separator 11.

In some embodiments, the kinetic impact device 10 may size reduce at least some brittle material of the oversize fraction from the size separator 9 (to less than about 4 millimeters, for example, and more generally to sizes less than the separation size of the size separator 11 in some embodiments) and may deform at least some malleable material of the oversize fraction from the size separator 9. In such embodiments, the size separator 11 may separate such brittle material from such malleable material because the size-reduced brittle material may generally be smaller than the separation size of the size separator 11 whereas the deformed malleable material may generally be larger than the separation size of the size separator 11. Therefore, in some embodiments, the oversize fraction from the size separator 11 may include material that is relatively resistant to grinding due to its hardness, toughness, or malleability for example. Therefore, in some embodiments, the particles in the oversize fraction from the size separator 11 will be primarily metal, but may also include ceramic, rock, and unburned wood or plastic for example.

In general, magnetic separation and eddy current separation may effectively extract metal from among relatively large particles, for example from among particles larger than the separation size of the size separator 11 in the embodiment shown. Therefore, the oversize fraction from the size separator 11 passes onto a conveyor belt including a magnetic separator 12, which in the embodiment shown is a magnetic head pulley for producing a clean magnetic metal product, and the non-magnetic portion of the oversize fraction from size separator 11 passes to an eddy current separator 13, where clean non-magnetic metals may be removed into one or more final products, leaving oversized trash for return to the incinerator. The magnetic separator 12 and the eddy current separator 13 thus extract metal from the oversize fraction from the size separator 11, and thus may be referred to as a second at least one metal extraction apparatus. The undersize fraction from the size separator 11 is discharged onto a conveyor 14, which returns the undersize fraction to the feed chute 4. Therefore, in the embodiment shown, the first screening section 59 also receives and size separates the undersize fraction from the size separator 11.

The undersize fraction from the size separator 9 enters a feed chute 15 and passes to a comminution device 16, which may be a mill, a further crushing device, an attrition vessel, or a grinding device in various embodiments, but which is a rod mill in the embodiment shown and which may more generally be referred to as a size reduction apparatus. As indicated above, the particles in the first oversize fraction may be dewatered in the first screening section 59, and therefore in some embodiments the undersize fraction from the size separator 9 may be re-slurried (for example by adding water until the solids are between about 50% and about 70% by weight of the resulting slurry) for wet grinding in the rod mill of the embodiment shown. The comminution device 16 in the embodiment shown therefore produces a slurry including a size-reduced undersize fraction from the size separator 9. As indicated above, the undersize fraction from the size separator 9 includes at least some of the first oversize fraction from the first screening section 59, and therefore the comminution device 16 in the embodiment shown functions as a size reducer to size reduce at least some of the first oversize fraction into a size-reduced first oversize fraction.

The system further includes a size separator 17 for receiving and size separating the slurry from the comminution device 16. The size separator 17 in the embodiment shown is capable of separating the slurry from the comminution device 16 into three size fractions. More particularly, the size separator 17 in the embodiment shown includes a screening device including an upper screen 61 and a lower screen 62 such that the upper screen 61 receives the slurry from the comminution device 16 and the lower screen 62 receives an undersize fraction from the upper screen 61.

The upper screen 61 has openings having a separation size that may be between about 7.5 millimeters and about 5 centimeters in some embodiments, and that may be about 19 millimeters in some embodiments. The upper screen 61 thus functions as a size separator to separate at least some of the slurry from the comminution device 16, according to the separation size of the upper screen 61, into the aforementioned undersize fraction including particles smaller than the separation size of the upper screen 61, and into an oversize fraction including particles larger than the separation size of the upper screen 61.

The lower screen 62 has openings having a separation size that may be between about 1.5 millimeters and about 25 millimeters in some embodiments, and that may be about 6 millimeters in some embodiments. In some embodiments, the comminution device 16 may size reduce at least some brittle material of the undersize fraction from the size separator 9 (to less than about 4 millimeters, for example, and more generally to sizes less than the separation size of the lower screen 62 in some embodiments, to sizes less than the separation size of the upper screen 61 but greater than the separation size of the lower screen 62 in some embodiments, or to both in some embodiments) and may deform at least some malleable material of the undersize fraction from the size separator 9. In such embodiments, one or both of the upper screen 61 and the lower screen 62 may separate such brittle material from such malleable material because the size-reduced brittle material may generally be smaller than the separation size of one or both of the upper screen 61 and the lower screen 62 whereas the deformed malleable material may generally be larger than the separation size of one or both of the upper screen 61 and the lower screen 62.

Further, as indicated above, the slurry from the comminution device 16 includes at least some of the first oversize fraction from the first screening section 59, and therefore the lower screen 62 may be referred to as a second size separator that generally size separates at least some of the size-reduced first oversize fraction (more particularly the size-reduced undersize fraction from the size separator 9 in the embodiment shown), according to a second separation size (namely the separation size of the lower screen 62 in the embodiment shown), into a second undersize fraction including particles smaller than the second separation size and into a second oversize fraction including particles larger than the second separation size. The second separation size may more generally be referred to as a fine separation size, and the second undersize fraction may more generally be referred to as a fine fraction. A slurry pump 18 receives the second undersize fraction and pumps the second undersize fraction to the aforementioned slurry pump 28.

In various embodiments including the embodiment shown, the second separation size may be larger than the first separation size. In such embodiments, a particle of incinerated waste that has not been size reduced (such as incinerated waste received at the feed chute 4 in the embodiment shown) and that has a size between the first separation size and the second separation size (for example, between about 3 millimeters and about 6 millimeters in some embodiments) will be size reduced at least once (in one or both of the kinetic impact device 10 and the comminution device 16 rather than entering a fine fraction at the first screening section 59 in the embodiment shown), whereas a particle of incinerated waste that has been size reduced (in the comminution device 16 in the embodiment shown) and that has a size between the first separation size and the second separation size (for example, between about 3 millimeters and about 6 millimeters in some embodiments) will avoid further such size reduction and instead enter a fine fraction (from the lower screen 62 in the embodiment shown). Therefore, embodiments where the second separation size is larger than the first separation size may avoid some further size reduction and may thereby avoid producing unnecessarily fine incinerated waste from which metal extraction may be more difficult.

In summary, in the embodiment shown, the main coarse fraction from the second screening section 60 (which, as indicated above, includes at least some of the first oversize fraction from the first screening section 59) is size reduced, and size reducing the main coarse fraction size involves:

1. size separating the main coarse fraction at a third size separator (the size separator 9), according a third separation size (the separation size of the size separator 9), into a third undersize fraction including particles smaller than the third separation size and into a third oversize fraction including particles larger than the third separation size;
2. size reducing the third oversize fraction in the kinetic impact device 10 into a size-reduced third oversize fraction; and
3. size reducing the third undersize fraction in the comminution device 16, independently from size reducing the third oversize fraction in the kinetic impact device 10, into a size-reduced third undersize fraction.

Further, the embodiment shown includes a fourth size separator (the size separator 11) for size separating the size-reduced third oversize fraction, according to a fourth separation size (the separation size of the size separator 11), into a fourth undersize fraction including particles smaller than the fourth separation size and into a fourth oversize fraction including particles larger than the fourth separation size.

Still further, the embodiment shown includes a fifth size separator (the upper screen 61) for size separating the size-reduced third undersize fraction, according to a fifth separation size (the separation size of the upper screen 61), into a fifth undersize fraction including particles smaller than the fifth separation size and into a fifth oversize fraction including particles larger than the fifth separation size.

In some embodiments, the upper screen 61 will substantially dewater the particles in the oversize fraction from the upper screen 61, and in general the particles in the oversize fraction from the upper screen 61 may include material that is relatively resistant to grinding due to its hardness, toughness, or malleability for example. Therefore, in some embodiments the particles in the oversize fraction from the upper screen 61 will be primarily metal, but may also include ceramic, rock, and unburned wood or plastic for example. Also, as indicated above, magnetic separation and eddy current separation are generally effective for extracting metal from among relatively large particles, for example from among particles larger than the fifth separation size of the upper screen 61 in the embodiment shown. Therefore, the fifth oversize fraction from the upper screen 61 in the embodiment shown is conveyed by a conveyor 19 to the magnetic separator 12 and then to the eddy current separator 13 described above.

Also, in some embodiments, the lower screen 62 will substantially dewater the particles in the oversize fraction from the lower screen 62. The second oversize fraction (namely the oversize fraction from the lower screen 62 in the embodiment shown, which includes at least some of the fifth undersize fraction from the upper screen 61) passes over a magnetic separator 20, which in the embodiment shown is a short conveyor belt with a magnetic drum at the discharge end. Material removed by the magnetic separator 20 passes into an iron bin as a part of the magnetic product while the non-magnetic material of the oversize fraction from the lower screen 62 is fed to a washing device 21 to separate substantially all material having a specific gravity of about 1 or less. The washing device 21 thus removes lighter material from at least a portion of the second oversize fraction (from the lower screen 62) that is not removed by the magnetic separator 20 before metal is extracted from that at least a portion of the second oversize fraction as described below. The washing device 21 in various embodiments may be a jig or cyclone for example, or in the embodiment shown an elutriation column with a countercurrent up-flow of water to carry light material to an overflow.

In the embodiment shown, overflow material from the washing device 21 passes over a dewatering screen to a trash bin for return to the incinerator, while underflow material from the washing device 21 flows by gravity into a gravity separator 22, which in various embodiments may include a mineral jig, a spiral concentrator, a centrifugal concentrator, or a heavy media concentrator, but in the embodiment shown is a spiral concentrator that separates the underflow material from the washing device 21 into a heavier fraction and a lighter fraction. In one embodiment, the heavier fraction includes particles having a specific gravity greater than about 2.8 and the lighter fraction includes particles having a specific gravity less than about 2.8, In some embodiments, the heavier fraction from the gravity separator 22 includes metal concentrates that pass over a dewatering screen 23 to a concentrate bin, and the gravity separator 22 in cooperation with the dewatering screen 23 thus extract metal from at least some of the heavier fraction. The dewatered metal from the heavier fraction from the gravity separator 22 could constitute a final mixed metal product including one or more of copper, brass, lead, tin, and stainless steel for sale to scrap metal dealers for example, or which could be fed to a separate process for additional cleaning and separation in some embodiments. The dewatered metal from the heavier fraction from the gravity separator 22 may also contain precious metals, and further processing could include one or more of hand sorting, optical sorting, thermal processing, and hydrometallurgical processing to generate separate high value metal products, depending for example on the application, local scrap markets, and metal prices.

The lighter fraction from the gravity separator 22 is dewatered with a screening device 24 and further comminuted or size reduced, in the embodiment shown by crushing the dewatered lighter fraction from the gravity separator 22 in a roll crusher 25, which may more generally be referred to as a size reduction apparatus. The size-reduced dewatered lighter fraction from the gravity separator 22 is then size separated at a sixth size separator 26, which in various embodiments may include a screen with openings having a sixth separation size between about 3 millimeters and about 16 millimeters, or about 6 millimeters in some embodiments. The sixth size separator 26 thus size separates the crushed dewatered lighter fraction from the gravity separator 22 according to the sixth separation size into a sixth undersize fraction including particles smaller than the sixth separation size and into a sixth oversize fraction including particles larger than the sixth separation size. In some embodiments, the roll crusher 25 may size reduce at least some brittle material of the size-reduced dewatered lighter fraction from the gravity separator 22 (to less than about 4 millimeters, for example, and more generally to sizes less than the sixth separation size in some embodiments) and may deform at least some malleable material of the lighter fraction from the gravity separator 22. In such embodiments, the sixth size separator 26 may separate such brittle material from such malleable material because the size-reduced brittle material may generally be smaller than the sixth separation size whereas the deformed malleable material may generally be larger than the sixth separation size.

The sixth oversize fraction is deposited in a fine aluminum bin, and the sixth size separator 26 thus extracts metal from at least some of the sixth oversize fraction. The magnetic separator 20, the gravity separator 22, the roll crusher 25, and the sixth size separator 26 may thus in the embodiment shown extract metal from the second oversize fraction (from the lower screen 62, which includes at least some of the fifth undersize fraction from the upper screen 61) independently from the extraction of metal from the fifth oversize fraction (from the upper screen 61) at the magnetic separator 12 and at the eddy current separator 13 as described above.

In summary, one or more of the magnetic separator 20, the washing device 21, the gravity separator 22, the dewatering screen 23, the screening device 24, the roll crusher 25, and the sixth size separator 26 in various embodiments may extract metal from at least some of the second oversize fraction, and may be referred to as a third at least one metal extraction apparatus.

The sixth undersize fraction (from the sixth size separator 26) is combined with wash water in a slurry pump 27, which pumps the sixth undersize fraction from the sixth size separator 26 to the aforementioned slurry pump 28. Therefore, in the embodiment shown, the sixth separation size may also be referred to as a fine separation size, and the sixth undersize fraction may also be referred to as a fine fraction. Also, in the embodiment shown, at least some of the first undersize fraction (from the first screening section 59 shown in FIG. 1), at least some of the second undersize fraction (from the second screen 62), and at least some of the sixth undersize fraction (from the sixth size separator 26) are combined into a combined fine fraction received at the slurry pump 28.

Further, as described below, metal may be extracted from the combined fine fraction independently of the extraction of metal from the second oversize fraction (from the lower screen 62, which includes at least some of the fifth undersize fraction from the upper screen 61 in the embodiment shown) at the magnetic separator 20, the gravity separator 22, the roll crusher 25, and the sixth size separator 26, and independently from the extraction of metal from the fifth oversize fraction (from the upper screen 61 in the embodiment shown) at the magnetic separator 12 and at the eddy current separator 13 as described above. Therefore, in summary, the size separator 17 size separates the slurry from the comminution device 16 into three size fractions, and metal may be extracted from the three size fractions independently.

In various embodiments, metal may be extracted from each of the three size fractions of the size separator 17 because different methods of metal extraction may be appropriate for each of the size fractions. For example, in the embodiment shown, the magnetic separator 12 and the eddy current separator 13 described above may extract metal from the largest of the three size fractions of the size separator 17 (namely the fifth oversize fraction from the upper screen 61), the magnetic separator 20, the gravity separator 22, the roll crusher 25, and the sixth size separator 26 described above may extract metal from the middle of the three size fractions of the size separator 17 (namely the second oversize fraction from the lower screen 62, which includes the fifth undersize fraction from the upper screen 61), and the slurry pump 28 receives the combined fine fraction from first undersize fraction (from the first screening section 59 shown in FIG. 1), from the second undersize fraction (from the second screen 62), and from the sixth undersize fraction (from the sixth size separator 26) to facilitate extraction of metal from the combined fine fraction as described below.

The embodiment shown may extract metal from the combined fine fraction because of common properties of the first undersize fraction (from the first screening section 59 shown in FIG. 1), the second undersize fraction (from the second screen 62), and the sixth undersize fraction (from the sixth size separator 26) that may arise in some embodiments. By extracting metal from the combined fine fraction, embodiments such as those described herein may extract metal from incinerated waste more effectively than some other methods of and systems for treating incinerated waste because many such other methods and systems may not exploit any common properties of sources for such fine fractions, and because many such other methods and systems often discard such fine fractions as waste rather than extracting metal from any such fine fractions.

Figure 3:
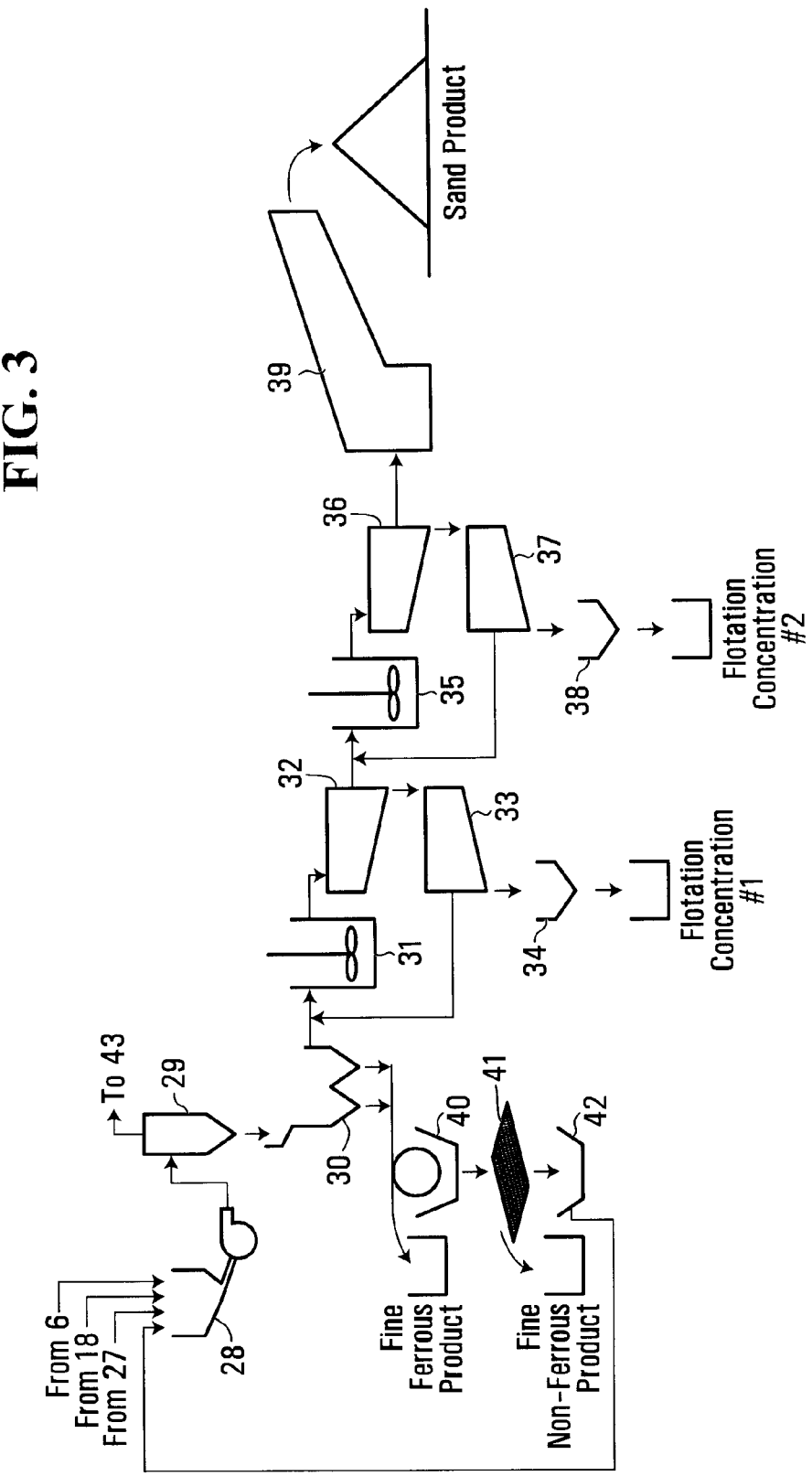
FIG. 3 is a schematic illustration of a fine fraction processing portion of the system of FIG. 1.

Referring to FIG. 3, the slurry pump 28 in the embodiment shown transfers the combined fine fraction to a slime size separator 29 for separating the combined fine fraction according to a slime separation size into at least two size fractions including at least one slime (or ultrafine) fraction including particles smaller than the slime separation size and at least one deslimed fraction including particles larger than the slime separation size. The at least one deslimed fraction may also be referred to as at least one sand fraction. The slime size separator 29 in some embodiments may employ established desliming methods, and for example may include one or more hydrocyclones at a low pulp density, a low-speed sand auger with suitable wash water addition, or an elutriation column in which a slime separation size may be controlled by a water upflow rate. In the embodiment shown, the slime size separator 29 includes one or more low-density hydrocyclones to produce an overflow slime fraction and an underflow deslimed fraction (or sand fraction). The nominal slime separation size will be in the range of about 2 microns to about 50 microns, depending for example on the nature of the raw ash and the intended uses of the final products. In one embodiment, about 80by weight of the particles of the slime fraction will be smaller than about 35 microns.

The deslimed fraction from the slime size separator 29 flows to a gravity separator 30 that gravity separates the deslimed fraction into a gravity concentrate and into gravity tailings. In various embodiments, the gravity separator 30 may include a mineral jig, a spiral concentrator, a centrifugal concentrator, a heavy media separation device, or any similar gravity separation device to produce a bulk gravity concentrate and relatively heavy-metal-reduced gravity tailings sand. In the embodiment shown, the gravity separator 30 is a mineral jig.

The gravity tailings from the gravity separator 30 are conditioned in a first conditioning tank 31 with a first at least one chemical reagent, which in various embodiments may include one or more of at least one xanthate, at least one dithiophosphate, at least one thiocarbamate, at least one thionocarbamate, at least one mercaptobenzothiozole, at least one hydroxamate, at least one fatty acid, at least one amine, at least one soluble base metal salt, at least one soluble sulphide compound, at least one alkali, at least one alkali earth, and at least one frothing agent, into a first conditioned slurry. In various embodiments, the first at least one chemical reagent may be added manually or automatically in the first conditioning tank 31. In some embodiments, the gravity tailings from the gravity separator 30 may be conditioned in the first conditioning tank 31 for about 5 minutes with about 50 grams of potassium amyl xanthate per tonne of the gravity tailings from the gravity separator 30, about 10 grams of sodium ethyl, sec-butyl dithiophosphate per tonne of the gravity tailings from the gravity separator 30, and about 20 grams of methyl isobutyl carbinol per tonne of the gravity tailings from the gravity separator 30.

The first conditioned slurry is then subjected to froth flotation, which in some embodiments may involve using commercially available multi-stage flotation cells to produce one or more cleaned metal concentrates and final cleaned sand tailings. In the embodiment shown, the first conditioned slurry from the first conditioning tank 31 is subjected to froth flotation in a first froth flotation cell 32 to produce a first concentrate and first tailings. In some embodiments, the first conditioned slurry may be about 30% solids by weight and may be subjected to about 10 minutes of froth flotation in the first froth flotation cell 32. In the embodiment shown, the first concentrate is further upgraded or cleaned in a first concentrate cleaning flotation cell 33, at a lower pulp density than the first conditioned slurry, into a first cleaned first concentrate, and first cleaner tailings from the first concentrate cleaning flotation cell 33 are returned to the first conditioning tank 31 such that the first froth flotation cell 32 receives the first cleaner tailings and also separates at least some of the first cleaner tailings into the first concentrate and into the first tailings.

In some embodiments, multiple cleaning stages may be included to obtain a higher metal content in a resulting final first cleaned flotation concentrate. In embodiments with multiple cleaning stages, the tailings from a given cleaning stage may be returned to the start of a previous cleaning stage, and the cleaned concentrate may be passed to a subsequent cleaning stage, except that the final first cleaned concentrate from the final cleaning stage may be dewatered. In the embodiment shown, the first cleaned concentrate from the first concentrate cleaning flotation cell 33 is the final first cleaned flotation concentrate, and is dewatered in a first thickener 34 into a first cleaned and dewatered flotation concentrate. In some embodiments, the first thickener 34 may separate water from the first cleaned concentrate by allowing the first cleaned concentrate to settle over time.

In the embodiment shown, the first tailings from the first froth flotation cell 32 are conditioned in a second conditioning tank 35 with a second at least one chemical reagent, such as about 100 grams of copper sulphate per tonne of the first tailings from the first froth flotation cell 32, to produce a second conditioned slurry. In various embodiments, the second at least one chemical reagent may include one or more of: at least one activator such as copper sulphate for example; at least one sulphidizing agent such as sodium hydrosulphide for example; at least one metal sulphide collector such as potassium amyl xanthate for example; and at least one frother such as methyl isobutyl carbinol for example. Also, in various embodiments, the second at least one chemical reagent may be added manually or automatically in the second conditioning tank 35. The second conditioned slurry is re-floated for about 10 minutes in a second froth flotation cell 36 (which may also be referred to as a scavenger flotation cell) to produce a second concentrate and second tailings. The second concentrate in the embodiment shown is cleaned in a second concentrate cleaning flotation cell 37 into a cleaned second concentrate, and second cleaner tailings from the second concentrate cleaning flotation cell 37 are returned to the second conditioning tank 35 such that in the embodiment shown, the second froth flotation cell 36 receives the second cleaner tailings and also separates at least some of the second cleaner tailings into the second concentrate and into the second tailings.

In some embodiments, multiple cleaning stages may be included to obtain a higher metal content in a resulting final second cleaned flotation concentrate. In embodiments with multiple cleaning stages, the tailings from a given cleaning stage may be returned to the start of a previous cleaning stage, and the cleaned concentrate may be passed to a subsequent cleaning stage, except that the final second cleaned concentrate from the final cleaning stage may be dewatered. In other embodiments, the second concentrate from the second froth flotation cell 36 may be combined with the first concentrate from the first froth flotation cell 32 and subjected to cleaning flotation as a combined product. In the embodiment shown, the second cleaned concentrate from the second concentrate cleaning flotation cell 37 is the final second cleaned flotation concentrate, and is dewatered in a second thickener 38 into a second cleaned and dewatered flotation concentrate. Again, in some embodiments, the second thickener 38 may separate water from the second cleaned concentrate by allowing the second cleaned concentrate to settle over time.

In the embodiment shown, the second tailings from the second froth flotation cell 36 are dewatered in a thickener or a sand auger 39, and the resulting final cleaned sand tailings may be a stackable sand product that may be used in producing concrete products for example.

The embodiment shown includes two-stage froth flotation and accordingly may produce the first cleaned and dewatered flotation concentrate from the first thickener 34 in the first froth flotation stage, the second cleaned and dewatered flotation concentrate from the second thickener 38 in the second froth flotation stage, and the final cleaned sand tailings from the thickener or sand auger 39. However, as indicated above, various embodiments may include different numbers of stages, each of which may include a respective conditioning tank, a respective froth flotation cell, a respective concentrate cleaning flotation cell or series of concentrate cleaning flotation cells, and a respective thickener similar to those described above to produce a respective cleaned and dewatered flotation concentrate generally as described above, and such embodiments may also produce final cleaned sand tailings from the last one of the froth flotation states as described above. Depending on quantities and grades, such cleaned and dewatered flotation concentrates may constitute separate saleable products, or may be combined with products (such as those described below) from the gravity concentrate from the gravity separator 30 for sale or further processing. In general, the various froth flotation stages may extract metal from at least some of the combined fine fraction received at the slurry pump 28.

The gravity concentrate from the gravity separator 30 in the embodiment shown is further processed by wet magnetic separation at a wet magnetic separator 40 into a magnetic fraction and into a non-magnetic fraction. The magnetic fraction from the wet magnetic separator 40 in various embodiments may be either re-combined with the products such as those described above from the gravity tailings from the gravity separator 30 or sold as an iron concentrate, depending for example on available markets and requirements for the makeup of the final cleaned sand tailings.

The non-magnetic fraction of the gravity concentrate from the gravity separator 30 in the embodiment shown is further upgraded and separated using a secondary gravity separator 41, which in various embodiments may be a cleaning jig or a shaking table for example. The secondary gravity separator 41 may produce a separate saleable precious metals concentrate and a mixed heavy metal product (including one or more of copper, lead, zinc, and tin for example) that may be directly saleable, or that may be further upgraded along with coarse metal concentrates using thermal or hydrometallurgical methods, for example, to produce higher-value metal products. The wet magnetic separator 40 and the secondary gravity separator 41 in the embodiment shown may therefore extract metal from the gravity concentrate from the gravity separator 30. Reject material from the secondary gravity separator 41 in the embodiment shown is collected in a launder 42 and returned to the slurry pump 28.

Figure 4:
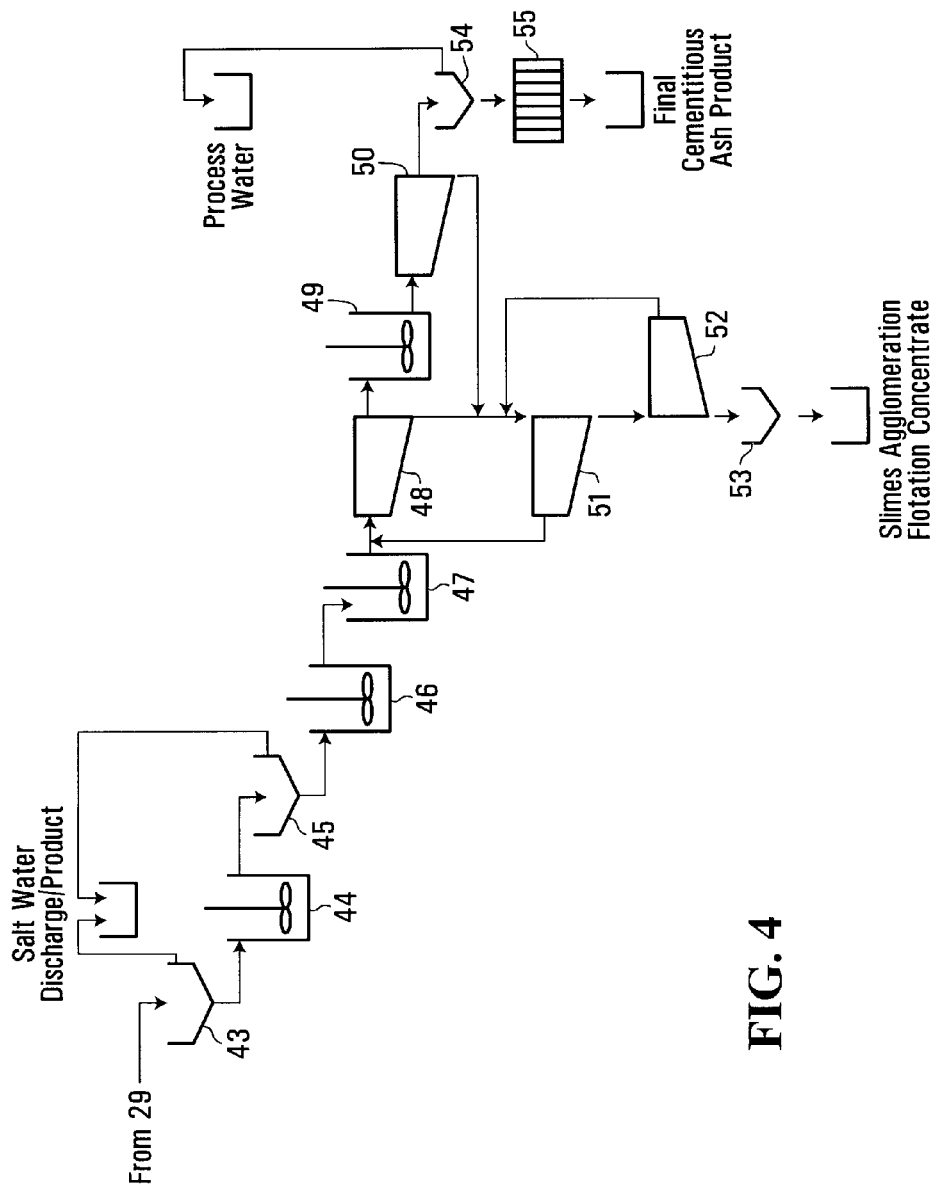
FIG. 4 is a schematic illustration of a slime (or ultrafine) fraction processing portion of the system of FIG. 1.

Referring to FIG. 4, the slime fraction from the slime size separator 29 may be handled in a number of different ways depending on the market potential for possible saleable products. In some embodiments, the slime fraction from the slime size separator 29 may not be processed into a useable product, but may instead be dewatered by flocculation, thickening, and filtration for transportation and disposal. In such embodiments, the leachability of any residual heavy metals in the slime fraction may be controlled by adding phosphate-based reagents or other stabilizers to ensure metal stability in the disposal environment.

However, the embodiment shown may process the slime fraction from the slime size separator 29 into useable products. In the embodiment shown, the slime fraction from the slime size separator 29 is partially dewatered in a primary thickener 43 (which may, in some embodiments, separate water from the slime fraction by allowing the slime fraction to settle over time, and which may be referred to as a third thickener for dewatering the slime fraction into a thickened slurry) to reduce salt content and increase pulp density to above 30% solids by weight of the slime fraction. The thickened slime fraction in the embodiment shown is then pumped to a conditioning tank 44 where the thickened slime fraction is diluted with clean water to a slurry having less than 25% solids by weight. Also, if necessary in some embodiments, an alkaline reagent such as calcium hydroxide or sodium carbonate may be added manually or automatically to the conditioning tank 44 to increase the pH of the slurry to above about 11, More generally, the pH of the slurry may be increased to oxidize aluminum in the slurry to prevent later oxidation of aluminum that may produce hydrogen in a finished concrete product for example. In some embodiments, the slurry may be mixed in the conditioning tank 44 at low speed for up to 1 hour.

In the embodiment shown, the conditioning tank 44 overflows into a secondary thickener 45 (which may, in some embodiments, separate water from the overflow of the conditioning tank 44 by allowing the overflow of the conditioning tank 44 to settle over time) for additional salt removal and to increase the pulp density of the overflow slurry from the conditioning tank 44 to more than 30% solids by weight, or to increase the pulp density of the overflow slurry from the conditioning tank 44 to about 40% solids by weight in some embodiments. The thickened slurry from the secondary thickener 45 is then pumped to a third conditioning tank 46 where a third at least one chemical reagent may be added. In various embodiments, the third at least one chemical reagent may include standard flotation reagents such as one or more of at least one xanthate, at least one dithiophosphate, at least one thiocarbamate, at least one thionocarbamate, at least one mercaptobenzothiozole, at least one hydroxamate, at least one fatty acid, at least one amine, at least one soluble base metal salt, at least one soluble sulphide compound, at least one alkali, at least one alkali earth, and at least one frothing agent. In various embodiments, the third at least one chemical reagent may be added manually or automatically in the third conditioning tank 46. In some embodiments, the thickened slurry from the secondary thickener 45 may be conditioned with about 50 grams of potassium amyl xanthate and about 10 grams of sodium ethyl, sec-butyl dithiophosphate per tonne of the thickened slurry from the secondary thickener 45 in the third conditioning tank 46 for about 5 minutes to about 10 minutes.

Overflow from the third conditioning tank 46 (which may be referred to as a third conditioned slurry) flows, in the embodiment shown, to a fourth conditioning tank including a high-shear mixer 47 where a fourth at least one chemical reagent may be added. The fourth at least one chemical reagent may include one or more of diesel fuel, kerosene, fuel oil, and at least one fatty acid. In various embodiments, the fourth at least one chemical reagent may be added manually or automatically in the high-shear mixer 47. In some embodiments, the fourth at least one chemical reagent includes about 500 grams of diesel fuel per tonne of overflow from the third conditioning tank 46. The slurry formed by combining the overflow from the third conditioning tank 46 with the fourth at least one chemical reagent (if any) may be mixed (with a mixing impeller in some embodiments) in the high-shear mixer 47 at high speed (about 800 rpm or from about 200 rpm to about 1,000 rpm, for example) for about 15 minutes or for up to about 30 minutes before overflowing to a third froth flotation cell 48 (which may also be referred to as a rougher flotation cell) where the slurry may separate into a third concentrate and into third tailings. In some embodiments, the overflow from the high-shear mixer 47 in the third froth flotation cell 48 may be diluted with clean water to 30% solids by weight, and about 20 grams of methyl isobutyl carbinol per tonne of overflow from the high-shear mixer 47 may be added to the overflow from the high-shear mixer 47. Also, in some embodiments, flotation in the third froth flotation cell 48 may last about 10 minutes.

Tailings from the third froth flotation cell 48 in the embodiment shown flow into a fourth conditioning tank 49 where a fifth at least one chemical reagent may be added. In various embodiments, the fifth at least one chemical reagent may be added manually or automatically in the fourth conditioning tank 49. In some embodiments, the fifth at least one chemical reagent may include about 100 grams of copper sulphate and about 10 grams of methyl isobutyl carbinol per tonne of tailings from the third froth flotation cell 48. In various embodiments, the fifth at least one chemical reagent may include one or more of: at least one activator such as copper sulphate for example; at least one sulphidizing agent such as sodium hydrosulphide for example; at least one metal sulphide collector such as potassium amyl xanthate for example; at least one frother such as methyl isobutyl carbinol for example; and at least one agglomerating agent such as kerosene for example. The conditioned tailings from the fourth conditioning tank 49 in the embodiment shown then overflow into a fourth froth flotation cell 50 (which may also be referred to as a final scavenger flotation unit) where, in some embodiments, the pulp density may be further diluted to about 20% solids by weight. In the fourth froth flotation cell 50 in the embodiment shown, the conditioned tailings from the fourth conditioning tank 49 may separate into a fourth concentrate and into fourth tailings.

In the embodiment shown, the third concentrate from the third froth flotation cell 48 and the fourth concentrate from the fourth froth flotation cell 50 are combined and cleaned in at least two stages. In other embodiments, the third concentrate from the third froth flotation cell 48 and the fourth concentrate from the fourth froth flotation cell 50 may be cleaned separately, and each such concentrate may be cleaned in one or more cleaner stages. More particularly, in the embodiment shown, the third concentrate from the third froth flotation cell 48 and the fourth concentrate from the fourth froth flotation cell 50 are cleaned in a first cleaner 51, and the cleaned concentrate from the first cleaner 51 is cleaned in a second cleaner 52. In some embodiments, the slurries cleaned in the first and second cleaners 51 and 52 may be diluted to about 10% solids by weight. Also, in some embodiments, small amounts of methyl isobutyl carbinol may be added if needed to maintain a suitable froth. In the embodiment shown, tailings from the first cleaner 51 flow back to the third froth flotation cell 48, tailings from the second cleaner 52 flow back to the first cleaner 51, and the cleaned concentrate from the second cleaner 52 is dewatered in a thickener 53, which may produce a dewatered cleaned concentrate in some embodiments by allowing the cleaned concentrate from the second cleaner 52 to settle over time. The dewatered cleaned concentrate from the thickener 53 may in some embodiments be combined with sand flotation concentrates (such as the first cleaned and dewatered flotation concentrate from the first thickener 34 and the second cleaned and dewatered flotation concentrate from the second thickener 38 described above, for example) for sale or for further upgrading.

In summary, the primary thickener 43, the conditioning tank 44, the secondary thickener 45, the third conditioning tank 46, the high-shear mixer 47, the third froth flotation cell 48, the fourth conditioning tank 49, the fourth froth flotation cell 50, the first cleaner 51, and the second cleaner 52 extract metal from at least some of the slime fraction from the slime size separator 29. Also, in summary, one or more of the slime size separator 29, the gravity separator 30, the first conditioning tank 31, the first froth flotation cell 32, the first concentrate cleaning flotation cell 33, the first thickener 34, the second conditioning tank 35, the second froth flotation cell 36, the second concentrate cleaning flotation cell 37, the second thickener 38, the wet magnetic separator 40, the secondary gravity separator 41, the primary thickener 43, the conditioning tank 44, the secondary thickener 45, the third conditioning tank 46, the high-shear mixer 47, the third froth flotation cell 48, the fourth conditioning tank 49, the fourth froth flotation cell 50, the first cleaner 51, and the second cleaner 52 in various embodiments may extract metal from one or more of the fine fractions mentioned above, and may be referred to as the first at least one metal extraction apparatus mentioned above.

The fourth tailings from the fourth froth flotation cell 50 in the embodiment shown are dewatered by flocculation and settling in a fourth thickener 54 and then filtered in a filter 55 to reduce moisture content as may be required to produce a final slimes product. If necessary in some embodiments, re-pulping with clean water and re-filtering may achieve a level of soluble salt content that may be desired in the dewatered fourth tailings from the fourth froth flotation cell 50. Further, in embodiments where the pH of the slurry was raised, for example to oxidize at lease some elemental aluminum in the slurry, then the pH of the slurry may be reduced, for example by contacting the slurry with carbon dioxide, before the slurry is thickened in the fourth thickener 54.

Also, in the embodiment shown, neutral wash water from various washing stages such as from the fourth thickener 54 may be recycled to earlier washing and dilution stages. However, solutions from the primary thickener 43 and from the secondary thickener 45 may have relatively high salt concentrations, and therefore in some embodiments such solutions may be withdrawn from the process as may be required, rather than recycled to earlier washing and dilution stages, to prevent high salt content in recycled process water. Also, where may be required, the solutions from the primary thickener 43 and from the secondary thickener 45 in some embodiments may be treated for discharge or re-use by commercial desalination techniques such as reverse osmosis or ultra-filtration, for example. The solutions from the primary thickener 43 and from the secondary thickener 45 could also be treated in some embodiments by evaporation and precipitation methods to recover useable industrial salts such as calcium chloride, for example.

In general, embodiments such as the system described above may recover or re-use a relatively large proportion of the incinerated waste received at the feed chute 4 when compared to other systems for treating incinerated waste. For example, some embodiments may recover or re-use all of the incinerated waste received at the feed chute 4 except for some dissolved salts.

More particularly, metal extracted by the various methods described above may have well-defined markets for recycling, re-use, or sale, and therefore marketing metal extracted by the various methods described above may be preferable to other methods that do not extract metal as efficiently. For example, the methods of extracting metal from at least some of the incinerated waste from the feed chute 4 (shown in FIG. 1) in the embodiment shown involve extracting metal from the at least some of the incinerated waste independently of further incineration of the at least some of the incinerated waste, which may allow more efficient extraction of metal when compared to other methods that involve further incineration of incinerated waste.

As indicated above, some embodiments may involve thermal processing of non-magnetic metal concentrates, such as controlled heating and mixing in an inert environment to melt low-melting-point metals such as lead and lead alloys, allowing them to flow freely away from the higher-melting-point metals to separate such low-melting-point metals from such higher-melting-point metals. Such thermal processing can be done at relatively low temperatures, allowing for simple materials of construction and low energy requirements.

Also as indicated above, some embodiments may involve hydrometallurgical processing, which may involve more complex processes and that may be more costly than thermal processing, but which may produce more valuable recovered-metal products. Such hydrometallurgical processing may be done in some embodiments in a separate facility off-site from the system described above, where concentrates may be combined from multiple sources. Also, such hydrometallurgical processing may in some embodiments involve multi-stage leaching and precipitation of copper, lead, tin, and zinc, with precious metals concentrated into a small residue. Such hydrometallurgical processing may be more economically justified if precious metal values are relatively high because precious metals may be more readily recovered in a saleable form by hydrometallurgical processing when compared to thermal processing for example.

Further, final cleaned sand tailings (from the thickener or sand auger 39 in the embodiment described above) may be used as an aggregate in concrete products or as other building or fill material, for example.

Still further, the final slimes product (from the fourth froth flotation cell 50, the fourth thickener 54, and the filter 55 in the embodiment shown) may have significant pozzolanic properties and may resemble coal fly ash in some embodiments, especially in embodiments where waste-to-energy fly ash is included in the raw feed (to the feed chute 4 in the embodiment shown). The final slimes product in some embodiments may be sufficiently washed, through multi-stage thickening and re-pulping, to reduce the salt content of the slimes product to a level that allows the resulting washed slimes product to be employed as an amendment in concrete mixtures as a partial replacement for commercial cement, such as a partial replacement for Portland cement for example. In other embodiments, the final slimes product may be combined with one or more additives to form a cement-free concrete product. Such additives may include one or more of sodium carbonate, sodium hydroxide, calcium hydroxide, potassium hydroxide, and fly ash.

Therefore, in some embodiments, washed and dewatered slimes may be transported to an existing concrete manufacturing facility for addition to commercial mixtures, or in other embodiments a stand-alone concrete product may be produced from a recipe that includes a large component of final cleaned sand tailings and a final slimes product from embodiments such as those described above, together with limited amounts of cement and possibly coarse aggregate. Such concrete products could be marketed based on their properties and recycled content, which may represent a substantially higher end-use value for the bulk of the processed ash residue when compared to other methods and systems.

Although specific embodiments have been described and illustrated, such embodiments should be considered illustrative only and not as limiting the invention as construed in accordance with the accompanying claims.

What is claimed is:

1. A method of treating incinerated waste, the method comprising:
   size separating at least some of the incinerated waste, according to a slime separation size, into a slime fraction comprising particles smaller than the slime separation size and into a deslimed fraction comprising particles larger than the slime separation size;
   conditioning at least some of the slime fraction with a first at least one chemical reagent into a first conditioned slurry;
   further conditioning at least some of the first conditioned slurry with a second at least one chemical reagent into a further conditioned slurry; and
   extracting metal by froth flotation from at least some of the further conditioned slurry.

2. The method of claim 1, further comprising:
   size separating at least some of the incinerated waste to produce a fine fraction; and
   extracting metal from at least some of the fine fraction, wherein extracting metal from the at least some of the fine fraction comprises:
      gravity separating the at least some of the fine fraction into a gravity concentrate and into gravity tailings; and
      extracting metal by froth flotation of the at least some of the gravity tailings.

3. The method of claim 2 wherein size separating the at least some of the incinerated waste to produce the fine fraction comprises:
   size separating at least some of the incinerated waste, according to a first separation size, into a first undersize fraction comprising particles smaller than the first separation size and into a first oversize fraction comprising particles larger than the first separation size;
   size reducing at least some of the first oversize fraction into a size-reduced first oversize fraction;

size separating at least some of the size-reduced first oversize fraction, according to a second separation size, into a second undersize fraction comprising particles smaller than the second separation size and into a second oversize fraction comprising particles larger than the second separation size; and combining at least some of the first undersize fraction and at least some of the second undersize fraction into the fine fraction.

4. The method of claim 3 wherein the first separation size is between about 1.4 millimeters and about 6.5 millimeters.

5. The method of claim 3 wherein the second separation size is between about 1.5 millimeters and about 25 millimeters.

6. The method of claim 3 wherein:

size reducing the at least some of the first oversize fraction comprises:

size separating the at least some of the first oversize fraction, according to a third separation size, into a third undersize fraction comprising particles smaller than the third separation size and into a third oversize fraction comprising particles larger than the third separation size; and size reducing at least some of the third undersize fraction into a size-reduced third undersize fraction; and wherein size separating the at least some of the size-reduced first oversize fraction according to the second separation size comprises size separating at least some of the size-reduced third undersize fraction according to the second separation size.

7. The method of claim 6 wherein the third separation size is between about 1 centimeter and about 10 centimeters.

8. The method of claim 6 further comprising:

size separating the at least some of the size-reduced third undersize fraction, according to a fourth separation size larger than the second separation size, into a fourth undersize fraction comprising particles larger than the second separation size and smaller than the fourth separation size, and into a fourth oversize fraction comprising particles larger than the fourth separation size, such that the second oversize fraction comprises at least some of the fourth undersize fraction;

extracting metal from at least some of the second oversize fraction independently from extracting metal from the at least some of the fine fraction; and extracting metal from at least some of the fourth oversize fraction independently from extracting metal from the at least some of the fine fraction and independently from extracting metal from the at least some of the second oversize fraction.

9. The method of claim 1 wherein the slime separation size is between about 2 microns and about 50 microns.

10. The method of claim 1 wherein the first at least one chemical reagent comprises one or more of: at least one xanthate; at least one dithiophosphate; at least one thiocarbamate; at least one thionocarbamate; at least one mercaptobenzothiozole; at least one hydroxamate; at least one fatty acid; at least one amine; at least one soluble base metal salt; at least one soluble sulphide compound; at least one alkali; at least one alkali earth; or at least one frothing agent.

11. The method of claim 1 wherein the second at least one chemical reagent comprises one or more of: diesel fuel; kerosene; fuel oil; or at least one fatty acid.

12. The method of claim 11 wherein the first at least one chemical reagent comprises one or more of: at least one xanthate; at least one dithiophosphate; at least one thiocarbamate; at least one thionocarbamate; at least one mercaptobenzothiozole; at least one hydroxamate; at least one fatty acid; at least one amine; at least one soluble base metal salt; at least one soluble sulphide compound; at least one alkali; at least one alkali earth; or at least one frothing agent.

13. The method of claim 1 wherein conditioning the at least some of the first conditioned slurry comprises mixing the at least some of the first conditioned slurry and the first at least one chemical reagent at a mixing speed between about 200 rpm and about 2000 rpm.

14. The method of claim 1 wherein extracting the metal by froth flotation from the at least some of the further conditioned slurry comprises separating at least some of the further conditioned slurry by froth flotation into a first concentrate and into first tailings.

15. The method of claim 14 wherein extracting the metal by froth flotation from the at least some of the further conditioned slurry further comprises:

conditioning at least some of the first tailings with a third at least one chemical reagent into a second conditioned slurry; and separating the second conditioned slurry by froth flotation into a second concentrate and into second tailings.

16. The method of claim 15 wherein the third at least one chemical reagent comprises one or more of: at least one activator; at least one sulphidizing agent; at least one metal sulphide collector; at least one frother; or at least one agglomerating agent.

17. The method of claim 15 further comprising producing a concrete product with at least some of the second tailings.

18. The method of claim 17 further comprising producing the concrete product with at least some of the first tailings.

19. A system for treating incinerated waste, the system comprising:

at least one slime size separator for size separating at least some of the incinerated waste, according to a slime separation size, into a slime fraction comprising particles smaller than the slime separation size and into a deslimed fraction comprising particles larger than the slime separation size;

a first conditioning tank configured to condition the at least some of the slime fraction with a first at least one chemical reagent into a first conditioned slurry;

a second conditioning tank configured to condition at least some of the first conditioned slurry further with a second at least one chemical reagent into a further conditioned slurry; and a first at least one metal extraction apparatus configured for extracting metal by froth flotation from at least some of the further conditioned slurry.

20. The system of claim 19 wherein the slime separation size is between about 2 microns and about 50 microns.

* * * * *